United States Patent

[11] 3,602,360

[72] Inventors Benjamin Halbach
Cologne, Nippes;
Karl-Hans Heinen, Cologne, Riehl, both of,
Germany
[21] Appl. No. 883,792
[22] Filed Dec. 10, 1969
[45] Patented Aug. 31, 1971
[73] Assignee Clouth Gummiwerke Aktiengesellschaft
Cologne, Germany
[32] Priority Dec. 11, 1968
[33] Germany
[31] P 18 13 861.9

[54] DAMAGE CONTROL ARRANGEMENT FOR CONVEYOR BELTS
15 Claims, 8 Drawing Figs.
[52] U.S. Cl................................................... 198/40,
198/232
[51] Int. Cl........................................................ B65g 43/02
[50] Field of Search........................................... 198/40, 232

[56] References Cited
UNITED STATES PATENTS
3,055,481  9/1962  Austin.......................... 198/40

*Primary Examiner*—Edward A. Sroka
*Attorney*—Michael S. Striker

ABSTRACT: An elongated conveyor belt of electrically nonconductive material has embedded therein electrically conductive inserts including at least one pair of electrical conductors extending over substantially the entire width of the belt and constituting an open circuit or an open induction loop, with the conductors being arranged so closely adjacent one another as to make contact if a breach occurs in the structural integrity of the belt. Impulse generating means, impulse receiving means and a source of electrical energy are provided and are operative for generating a signal indicating a breach in cooperation with the conductors when the latter contact one another.

DAMAGE CONTROL ARRANGEMENT FOR CONVEYOR BELTS

BACKGROUND OF THE INVENTION

The present invention relates generally to conveyor belts, and more particularly to a damage control arrangement for conveyor belts.

Conveyor belts are frequently utilized in applications and under conditions where they are subject to a breach of structural integrity, that is damage which causes penetration of the conveyor belt in transverse or in longitudinal direction. Assuming that this damage is not of such magnitude as to immediately cause severance of the belt, an occurrence which is not very frequent, it is nevertheless necessary to detect even lesser damage as rapidly as possible because during continued operation of the belt even small penetrations become constantly enlarged and will eventually result in failure of the belt.

Visual observation of the belt is of course the simplest manner of providing damage control. However, it is not entirely reliable, it is frequently impossible, and if and when it is possible, it requires at least the part-time services of an operator whose work might be more economically and more productively utilized elsewhere. It has therefore become known to embed in the conveyor belt, which usually consists of rubber or similar material, for instance synthetic plastic elastomer, electrically conductive inserts through which an electric current flows either constantly or at least upon passage of the given conveyor belt increment through a sensing point. The purpose is to provide a signal and/or termination of the operation of the conveyor belt installation upon occurrence of penetration of the belt, with the operation of these devices being based on the fact that such penetration will break at least one of the embedded inserts and thereby interrupt the current flowing in the circuit. This, in turn, causes generation of a signal and/or switching-off of the installation.

However, damage control arrangements of this type which are known from the prior art suffer from certain disadvantages. In trough-shaped conveyor belts—as opposed to flat conveyor belts—it has been known to happen that after the belt is torn the torn surfaces lie so closely together that the electrically conductive inserts make contact with one another and no interruption of the electric circuit occurs. Again, the presence of water or moisture in general may cause an electrical connection to be made or maintained between the severed ends of a broken embedded insert.

However, a still more serious disadvantage of the known construction is the fact that the detection of longitudinally extending penetrations—that is penetrations extending lengthwise of the conveyor belt—is possible only in the region of the sensing points. Thus, even if the arrangement of the sensing points or installation can be so chosen that parts of the belt 1 which are known to be particularly subjected to penetration risks are included, only a limited security for the belt is thereby provided. For example, if a rung of the belt is supplied with only one sensing point, the belt may be cut over its entire length if a sharp-edged foreign object penetrates the belt immediately downstream of the sensing point because the penetration will then not be sensed until the belt has completed one entire revolution.

It is evident, therefore, that improvements in this field are highly desirable.

SUMMARY OF THE INVENTION

It is, accordingly, an object of the present invention to provide such improvements.

More particularly, it is an object of the present invention to provide a damage control arrangement for conveyor belts which avoids the aforementioned disadvantages.

In pursuance of the above objects, and others which will become apparent hereafter, one embodiment of the invention comprises, briefly stated, a damage control arrangement for conveyor belts, comprising an elongated conveyor belt of predetermined width and of electrically nonconductive material, electrically conductive insert means embedded in the belt and including at least one pair of conductors extending over substantially the entire width and constituting an open circuit or induction loop and being arranged so closely adjacent as to contact one another upon occurrence of a breach in the structural integrity of the belt, and impulse generating means, impulse receiving means and a source of electric energy operative for generating, upon a breach in the structural integrity of the belt and in cooperation with the conductors in response to contact of the same, a signal indicating such breach.

Thus, if the conveyor belt is penetrated the conductors which lie closely adjacent one another, contact one another so that the open circuit or open induction loop is closed whereby an impulse is emitted which is received by the receiver and triggers generation of a signal.

It will be appreciated that with the arrangement according to the present invention the occurrence of a cut, particularly a longitudinal extending cut in the belt, is announced at the moment at which it occurs. This is evidently a considerable advantage over the prior art. Furthermore, the life of the current source utilized for the electrical impulse generator corresponds to its shelf life because no current flows as long as the belt remains undamaged. Finally, functioning of the arrangement is assisted by the presence of moisture, rather than being detrimentally effected thereby.

The conductors may consist of multiple-filament cables or braids so that, when they are damaged, the severed ends of the filaments assume a brushlike configuration whereby the contacting of filament ends of the adjacent conductors—and the production of a short circuit thereby—is favored. The conductors may consist of copper cables or of braids consisting of a mixture of steel and copper wires or elements. They may be insulated by a nylon insulating braid. If desired, the conductors may be arranged coaxially with one conductor coaxially surrounding the other.

It is advantageous in accordance with a further embodiment of the invention to provide exposed portions of the conductors at one lateral edge of the conveyor belt, because this makes it possible to readily test the proper operation of the arrangement from time-to-time—that is aside from such times as the arrangement responds to an actual penetration of the conveyor belt—simply by momentarily and purposely short circuiting the conductors at their exposed portions and observing the response in terms of generation of the signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
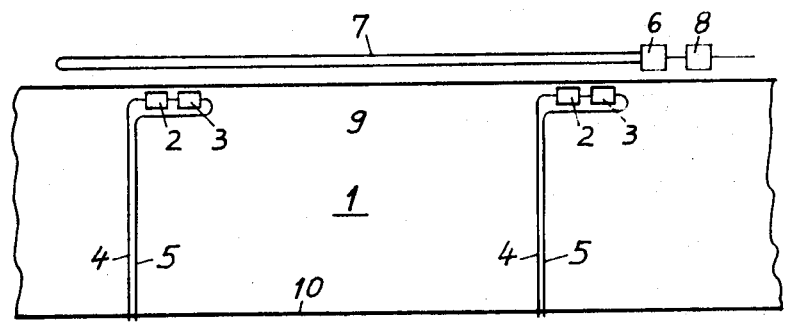
FIG. 1 is a somewhat diagrammatic fragmentary top plan view of one embodiment of the invention.

Discussing firstly the embodiment shown in FIG. 1 it will be seen that reference numeral 2 identifies electrical impulse transmitters of known construction which are embedded at desired—that is regular or irregular distances—in the material of the conveyor belt 1, which latter may consist in known manner of electrically nonconductive material such as rubber, synthetic plastic or the like. The transmitters 2 are connected with a current source 3 and with electrical conductors 4 and 5. The source 3 and the conductors 4 and 5 are also embedded in the material of the belt 1.

A receiver 6 is arranged located laterally adjacent the belt 1 and provided with an aerial 7 extending longitudinally of the belt 1; the receiver 6 is connected with a switching device 8 of known construction. According to the invention it is advantageous that the impulse generators 2 and current source 3 be arranged as closely as possible to one edge 9 of the belt 1.

Different types of current sources 3 are suitable. Such a source may for instance be one of the well-known "button" batteries which are very small and are readily embedded.

According to the invention it is advantageous that at the opposite edge 10 of the conveyor belt 1 portions of the conductors 4 and 5 be exposed so that the installation may be tested at will simply by briefly short-circuiting the exposed portions of the conductors 4 and 5 to thereby test and observe the proper functioning of the installation.

The electrical conductors 4 and 5 may be arranged closely side-by-side, closely superimposed, or coaxially with one another. In any case, they may consist of multiwire or multifilament cables or of braids of multifilaments, the purpose being to assure that, when the conductors 4 and 5 are severed or at least damaged, the severed ends of all or some of the individual filaments or wires will be spayed apart and assume a brushlike configuration at the point of severage, whereby a contact of at least some of the severed filaments of the respective conductors 4 and 5 with one another is assured. Aerial 7 or antenna 7 is constructed in known manner as an induction loop and the switching device 8 evaluates a signal coming from the receivers upon the latter receiving a signal from the impulse generator 2, whereupon the switching device 8 itself generates a signal and/or switches off the drive for the conveyor belt 1. The drive is not shown because it is of course conventional as is in fact the construction of the receiver 6 and the switching device 8.

Figure 2:
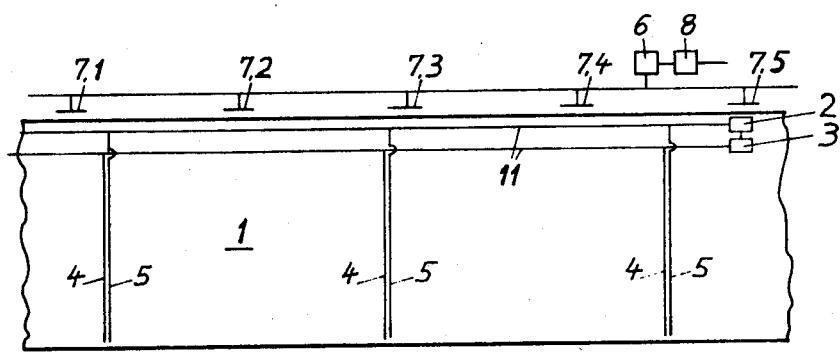
FIG. 2 is an illustration similar to FIG. 1 but showing a further embodiment of the invention.

The embodiment illustrated in FIG. 2 utilizes several pairs of conductors 4 and 5. These can be connected in the embodiment of FIG. 2 by providing longitudinal conductors 11 which unite several of these pairs of conductors 4 and 5 into a group. In this case, only a single impulse transmitter 2 and a single current source 3 need be associated with each such group. The receiver 6, however, is provided with several antennas in form of conduction loops which are identified with reference numerals 7.1, 7.2, 7.3, 7.4 and 7.5 corresponding in number to the number of groups provided. This arrangement is particularly suitable for operation where strong electrical interference fields are present.

Figure 3:
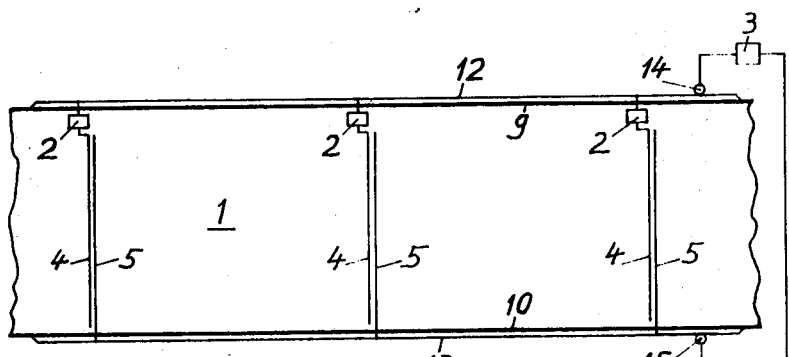
FIG. 3 also is analogous to FIG. 1 showing, however, yet another embodiment of the invention.

The embodiment of FIG. 3 illustrates another approach to supplying electric current to the impulse transmitters 2. Here, contact strips 12 and 13 are associated with the edges 9 and 10 of the conveyor belt 1, and in turn are connected with a source of electric current 3 via contact rollers 14 and 15 or suitable contact pieces, such as sliders or the like. In another respect FIG. 3 corresponds to the preceding embodiments, except that the receiver has not been illustrated for the sake of simplicity. It will be appreciated, however, that it is required.

Figure 4:
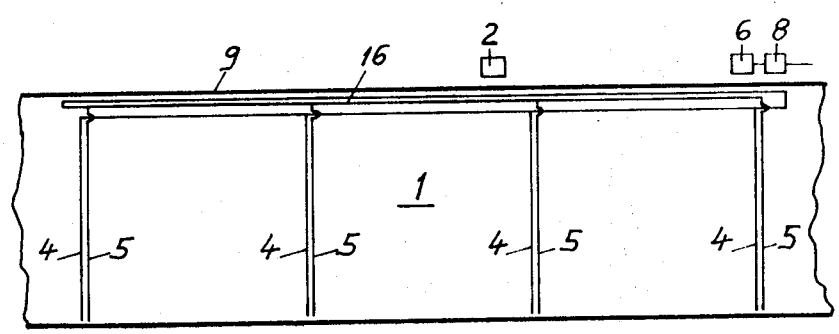
FIG. 4 is also similar to FIG. 1 in illustration but showing another embodiment of the invention.

The embodiment shown in FIG. 4 provides a construction wherein the electrical conductors 4 and 5 are connected by a conducting loop 16 arranged adjacent the edge 9 of the belt 1. The conductors 4 and 5 in conjunction with the loop 16 form an opening coupling loop. The impulse transmitter 2 and the receiver 6 are located adjacent the conveyor belt 1 and the transmitter 2 transmits impulses constantly. In this embodiment an operative connection between transmitters 2 and the receivers 6 is obtained only when there is contact between the conductors 4 and 5, by virtue of the fact that the same form with the loop 16 an open coupling loop.

Figure 5:
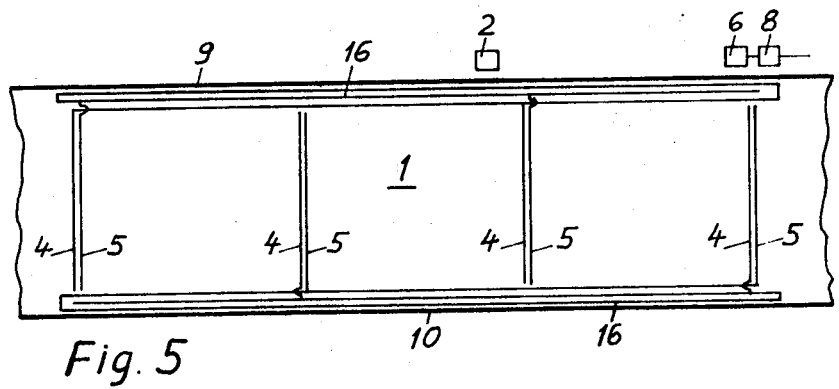
FIG. 5 shows a still further embodiment of the invention in the view similar to FIG. 4.

The embodiment shown in FIG. 5 is analogous to that of FIG. 4. It differs from the same in that a further conducting loop 16 is arranged in the vicinity of the belt edge 10 and is also connected with the conductors 4 and 5. Thus, the embodiment of FIG. 5 provides two of the loops 16 and this makes it possible that any corresponding section of the belt 1 which is so provided can be inserted into the belt—which conventionally consists of a plurality of such sections which are connected thereto—in any desired axial orientation so that, when the belt is assembled from the individual belt sections, it is not necessary to pay attention to the proper provision of the conducting loops 16 or at one edge of the belt.

Figure 6:
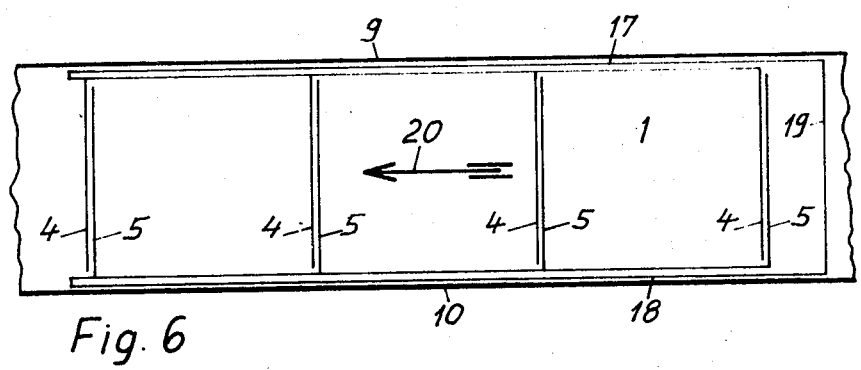
FIG. 6 is also a view analogous to FIG. 4 but illustrating a different embodiment of the invention.

In accordance with the embodiment shown in FIG. 6 a conducting loop 17 is arranged adjacent the belt edge 9 and a similar loop 18 is arranged adjacent the belt edge 10. An electrical conductor 19 connects the loops 17 and 18 with one another, and the conductors 4 are in turn connected with the loop 17 whereas the conductors 5 are connected with the loop 18. Here, however, the respective sections making up the belt 1 must be so inserted into the belt when they are assembled that the direction of movement corresponds to the direction of the arrow 20.

In the apparatus illustrated in FIG. 6, as well as in FIGS. 1–5, damage by penetration of the conveyor belt 1 with concomitant severing of associated ones of the conductors 4 and 5, causes short-circuiting between the associated severed conductors 5, in response to which the impulse generator 2 will yield an impulse. This impulse is received by the receiver 6 and the switching device 8 produces—upon receiving an indication from the receiver 6—a signal and/or switches of the drive for the conveyor belt 1. Thus, signaling and/or switching off of the drive will take place immediately upon occurrence of damage to the belt 1, that is penetration of the same.

Figure 7:
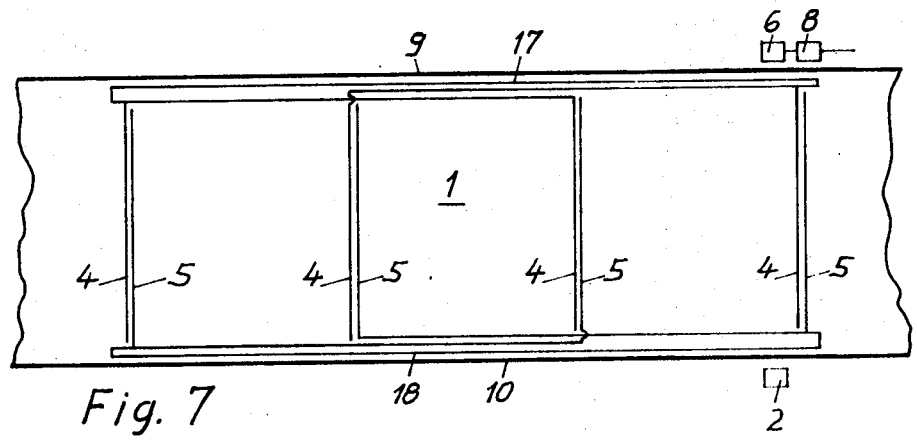
FIG. 7 is a view similar to FIG. 4 showing still a further embodiment of FIG. 1.

The embodiment shown in FIG. 7 differs from the preceding embodiments in that the open induction loops constituted by the conductors 4 and 5 and the loops 17 and 18 is closed only when at least two of the pairs of conductors —with each pair consisting of a conductor 4 and a conductor 5—are damaged. Therefore, this embodiment should be used only for any reason it is not possible to locate both the impulse generator 2 and the receiver 6 at one and the same side of the conveyor belt 1.

Figure 8:
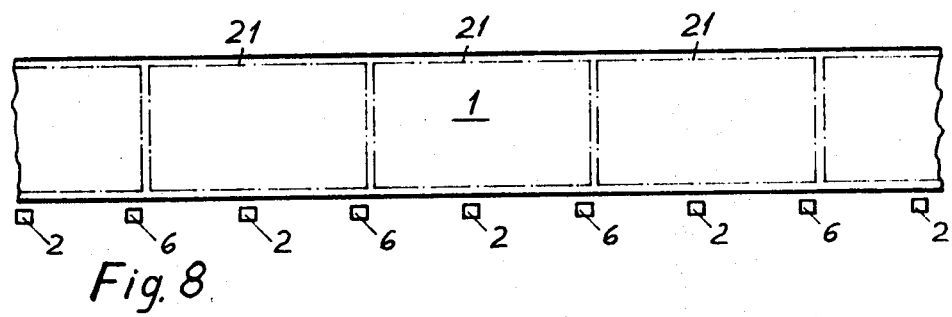
FIG. 8 is also a view similar to FIG. 4 but illustrating yet an additional embodiment of the invention.

Finally, the embodiment illustrated in FIG. 8 shows several groups 21 arranged one behind the other and illustrated for the sake of simplicity in broken lines. These groups correspond for instance to the groups discussed above with reference to FIG. 2.

To assure in the embodiment of FIG. 8 that an operative connection will immediately be established between at least one of the impulse generators 2 and one of the receivers 6 when a longitudinal penetration of the belt occurs, the distance between the individual impulse generators 2 and the spacing of the individual receivers 6 corresponds approximately to the length—as seen in longitudinal direction of the belt 1—of the respective group 21. The spacing of the impulse generators 2 from the receivers 6 should be so chosen that there is no need for interference. It will be appreciated that the impulse generators in this as in the various other embodiments may be arranged to have different frequencies, and this will provide a simple manner of obtaining a distinction between different sections of the belt, because a particular frequency of a given impulse generator 2 can indicate precisely where a penetration has occurred in the belt 1.

It will be understood that each of the elements described above, or two or more together, may also find a useful application in other types of constructions differing from the types described above.

While the invention has been illustrated and described as embodied in a damage control arrangement for conveying belts, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A damage control arrangement for conveyor belts, comprising an elongated conveyor belt of predetermined width and of electrically nonconductive material; electrically conductive insert means embedded in said belt, and including at least one pair of conductors extending over substantially said predetermined width and constituting an open circuit or induction loop and being arranged so closely adjacent as to contact one another upon occurrence of a breach in the structural integrity of said belt; and impulse generating means, impulse receiving means and a source of electric energy operative for generating, upon a breach in the structural integrity of said belt and in cooperation with said conductors in response to contact of the same, a signal indicating such breach.

2. An arrangement as defined in claim 1, wherein at least one of said conductors comprises a plurality of electrically conductive filaments.

3. An arrangement as defined in claim 1, wherein said conductors are multiple-filament braids.

4. An arrangement as defined in claim 1, wherein said conductors are stranded conductors.

5. An arrangement as defined in claim 1, wherein said conductors are cables sheathed with steel wire strands.

6. An arrangement as defined in claim 1, wherein said conductors are braids composed of steel and copper filaments.

7. An arrangement as defined in claim 1, wherein at least one of said conductors is tubular and coaxially surrounds the other of said conductors.

8. An arrangement as defined in claim 1, said conveyor belt having opposite longitudinal edges, and wherein said conductors each have a portion exposed at one of said edges so as to facilitate access for testing by an operator.

9. An arrangement as defined in claim 1; said conductor means comprising a plurality of additional pairs of conductors similar to and spaced from the first-mentioned pair lengthwise of said belt; and electrically conductive connecting means extending lengthwise of said belt and connecting a plurality of said pairs so that the same constitute a group which is elongated lengthwise of said belt.

10. An arrangement as defined in claim 1, said impulse generating means and said source of electrical energy being embedded in said belt in electrically conductive connection with said conductors, and forming with the latter an open electric circuit.

11. An arrangement as defined in claim 1, said impulse generating means, said impulse receiving means and said source of electric energy being arranged adjacent to said belt, and wherein said conductors constitute an open induction loop.

12. An arrangement as defined in claim 1, wherein said impulse generating means and said impulse receiving means are located at opposite lateral sides of said belt.

13. An arrangement as defined in claim 1; and further comprising at least one induction-loop antenna provided on and cooperating with said impulse receiving means.

14. An arrangement as defined in claim 9, said impulse generating means comprising a plurality of impulse generators, and said impulse receiving means comprising a plurality of impulse receivers; and wherein successive generators and successive receivers are spaced lengthwise of said belt by a distance corresponding substantially to the length of said group.

15. An arrangement as defined in claim 1, said impulse generating means comprising at least two impulse generators, and said impulse receiving means comprising at least two impulse receivers; and wherein said impulse generators operate on different frequencies.